Sept. 1, 1953 W. H. OBERWORTMAN 2,650,745
FEEDER FOR FODDER CUTTERS
Filed June 7, 1949 2 Sheets-Sheet 1

Inventor
W. H. Oberwortman
By Mason, Porter, Diller & Stewart
attys.

Sept. 1, 1953   W. H. OBERWORTMAN   2,650,745
FEEDER FOR FODDER CUTTERS

Filed June 7, 1949   2 Sheets-Sheet 2

Inventor
W. H. Oberwortman,
By Mason, Porter, Miller & Stewart
attys.

Patented Sept. 1, 1953

2,650,745

UNITED STATES PATENT OFFICE 2,650,745

FEEDER FOR FODDER CUTTERS

Walter H. Oberwortman, Lamar, Colo., assignor to W. H. O. Alfalfa Milling Company, Lamar, Colo.

Application June 7, 1949, Serial No. 97,695

7 Claims. (Cl. 222—410)

The following specification relates to a novel feeder for fodder cutters and similar agricultural machinery. It is particularly well adapted for the harvesting of forage crops, such as clover, lespedeza, alfalfa and the like.

It is a practice of long standing to comminute fodder crops, such as those mentioned above, in the field and to pack them compactly in bags for transportation and storage. However, these crops are extremely bulky and awkward to handle. It is difficult to bring them rapidly and compactly to the machine which does the cutting or grinding.

I have devised a feeding means by which such fodder material can be fed rapidly to the machine which cuts or grinds it.

It is also an object of my invention to increase the capacity of the device to receive the bulk material and compact it and feed it to the cutter.

In accordance with the necessity of field practice, it is a further object of my invention to simplify the structure to the utmost degree so that no particular skill will be needed for use or maintenance of the equipment.

A still further object of my invention is to construct the device in such a manner that it will have the utmost ruggedness to withstand hard service and rough treatment.

My improved machine is adapted for operation in conjunction with existing harvesting equipment and the common types of portable power plants.

Among the objects of my invention is to shield the operating means from the material being fed, but at the same time leave it accessible for maintenance, adjustment and repair.

Other objects of the invention will be apparent from the following description of the preferred form, as illustrated in the accompanying drawings in which.

Figure 1:
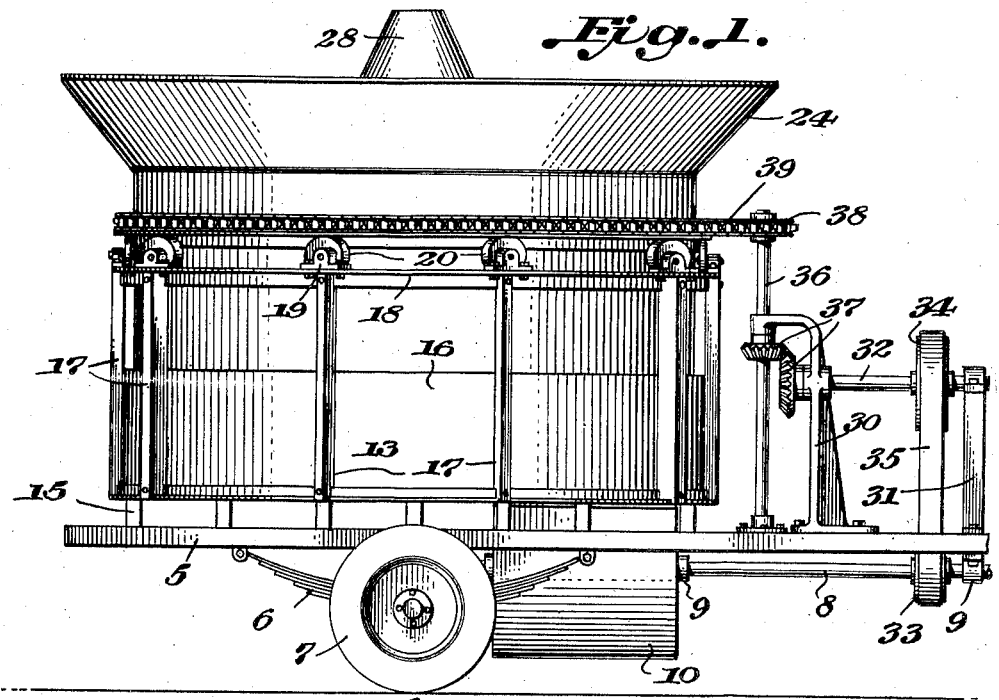
Figure 1 is a side elevation of the improved feeder.

Broadly speaking, the feeder consists of a stationary hopper, the floor of which opens into the cutting or grinding machine. The hopper has means consisting of a rotary drum with an enlarged upper throat to receive the loose bulky forage crop. This drum is caused to rotate and by means of internal ribs or vanes the material is given a rotary movement resulting in it being compacted and fed to the cutting mechanism.

As illustrated in the drawings, I have shown the feeder to be mounted upon a vehicle, such as a trailer or the like. This trailer has a platform or floor 5 carried on springs 6 and a pair of wheels 7.

Beneath the floor 5 there is a longitudinal power shaft 8 suitably driven from a portable power plant not shown. The shaft 8 is carried in bearings 9. The shaft 8 passes through the shell or concave portion 10 of a cutter or grinder. The latter has been shown as a rotary cylinder 11 armed with teeth 12. These teeth cooperate with similar ones 40 on the inner face of the concave to comminute, shear or otherwise grind the rough fodder.

Figure 2:
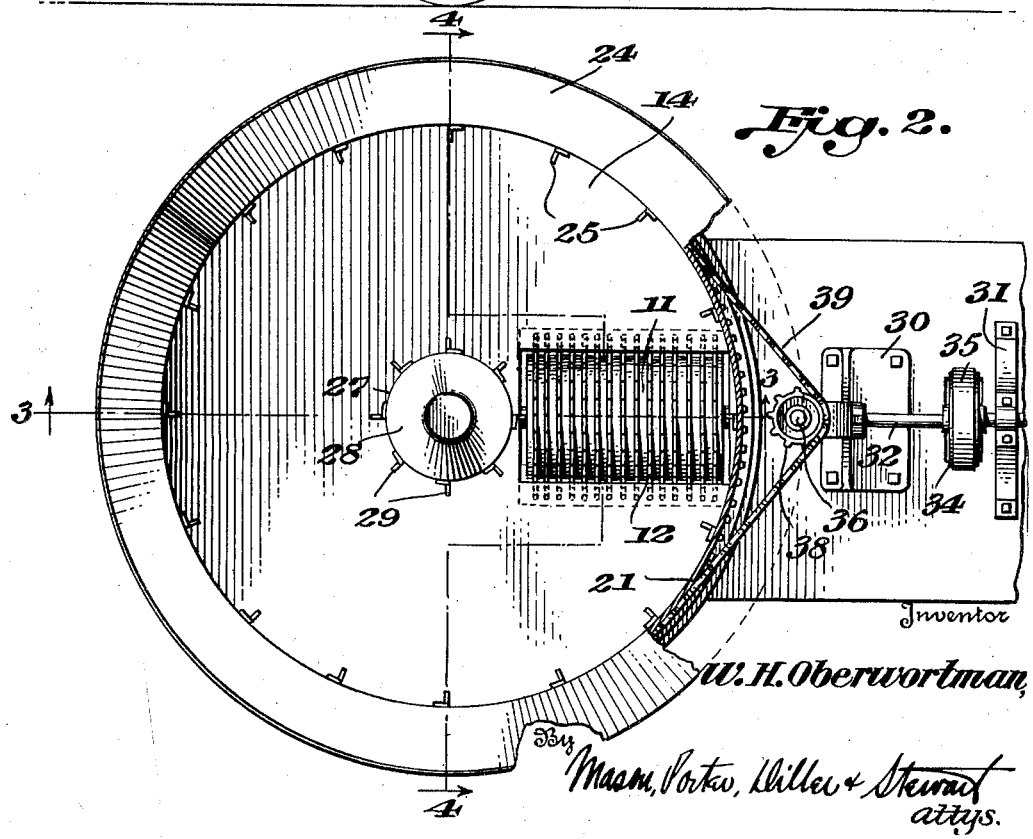
Figure 2 is a top plan view, part of the rim being broken away to show parts in section.

The hopper 13 has a floor or bottom 14 which rests upon a series of posts 15 arranged in a circle upon the floor 5. The bottom 14 is cut away, as shown in Figure 2, to expose the rotary cylinder 11 of the cutter.

The side wall 16 of the hopper 13 is stationary resting upon the bottom 14. Surrounding the side wall 16 and resting on the outer periphery of the bottom 14 is a series of vertical posts 17. These posts extend above the upper edge of the side wall 16. The tops of the posts 17 support a horizontal ring 18.

A series of bearings 19 is mounted upon the ring 18 and one is above each post 17. These bearings carry rollers 20.

Figure 3:
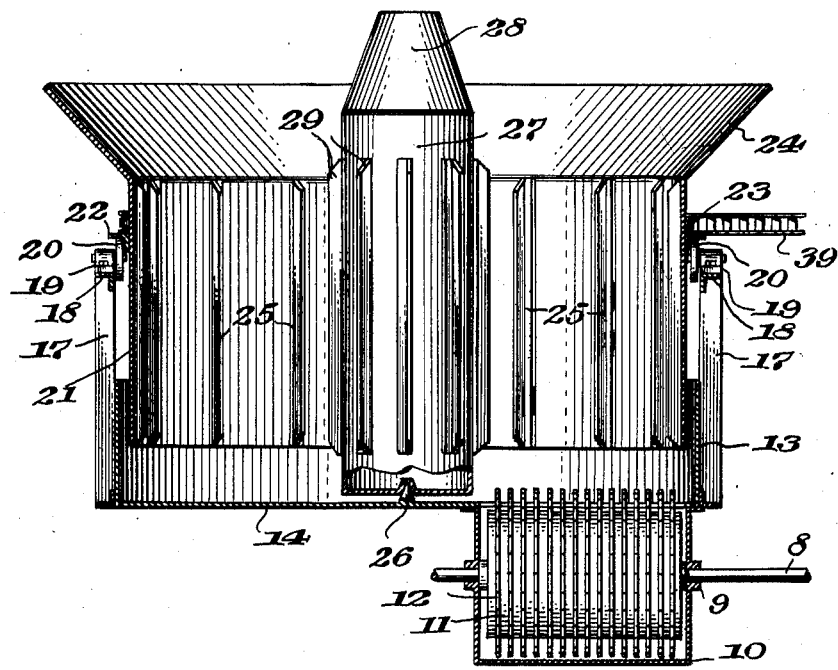
Figure 3 is a vertical cross section of the equipment taken on the line 3—3 in Figure 2
Figure 4:
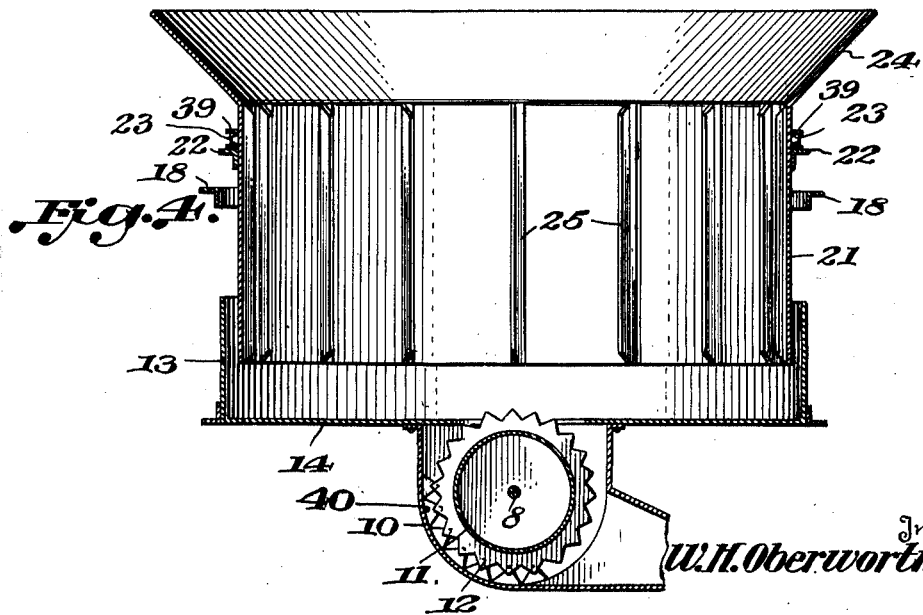
Figure 4 is a similar transverse vertical section taken on the line 4—4 of Figure 2.

A rotary drum 21 fits loosely within the upper edge of the side wall 16, as shown more particularly in Figures 3 and 4. This drum 21 has a horizontal track 22 in the form of an angle-iron or the like. The track 22 rests upon the rollers 20 and revolves above them.

Above the track 22 the drum is provided with a toothed ring gear 23.

A significant part of the improvement is the wide flaring rim 24 extending above and around the drum 21 and overhanging the ring gear 23 and the bearings 19.

The inner face of the drum 21 is provided with a series of internal ribs 25. These ribs are preferably of angle-iron construction and extend inwardly far enough to be engaged by the loose bulky fodder.

Centrally of the bottom 14 there is provided an upstanding boss 26 which forms a center bearing. A cylindrical guide 27 is mounted axially on the center bearing 26. The guide extends above the edge of the rim 24 where it is provided with a conical or tapering portion 28.

The vertical side of the guide 27 is equipped with vanes or ribs 29. These vanes are opposite the ribs 25 and cooperate with the latter in the compacting and feeding of the fodder. It will be observed that the center guide 27 is poised above the bearing 26 by the bulk of material uniformly fed into the hopper. By the rotation of the drum 21, cylindrical guide 27 is indirectly caused to rotate by the presence of the material being fed.

The floor or platform 5 is provided with a bracket 30 and a spaced pillar 31. A countershaft 32 is journaled in the bracket 30 and the pillar 31 above, and parallel to the power shaft 9.

The power shaft 8 is provided by a pulley 33 and a corresponding pulley 34 is keyed to the counter-shaft 32. The counter-shaft 32 is driven by a belt 35 connecting the pulleys 33 and 34.

A rotary shaft 36 is journaled vertically on the platform 5 and the bracket 30, as shown in Figures 1 and 2. A pair of miter gears 37 form a driving connection between the counter-shaft 32 and the vertical shaft 36. The upper end of the shaft 36 carries a pinion gear 38 in the same plane as the ring gear 23 on the drum. A chain 39 is trained around the ring gear 23 and the pinion 38. It will be noted, from Figure 2, that this driving means is shielded by the overhanging rim 24 of the drum.

It will be clearly apparent that the machine above described in detail can be transported readily to the harvest field and there operated by any tractor or other portable power plant. The driving shaft 3 provides power both for the grinding or cutting machine cylinder 11 and the rotary drum 21.

The widely extending rim 24 of the drum permits the fodder, as cut, to fall into the drum between the vanes 25 and 29.

Rotation of the drum 24 serves indirectly to carry around the cylindrical guide 27. The material between the drum and the guide is caused to travel in a rotary path and to become compacted. As it reaches the opening above the cylinder 11, the material is drawn down by the teeth of the cylinder and the cutting operation is carried on in the usual manner. The relation of parts between the rotary drum, the hopper proper and the cutting cylinder and their spacing is such that the material is drawn into the cutting machine without friction from the side wall 18.

The chopped fodder is delivered from the concave shell 10 by the usual pneumatic means to the customary bagging station.

The above arrangement of parts is particularly effective to carry out the objects of the invention described. The device is rugged, simple and has a high capacity. It lends itself to operation in conjunction with present harvesting equipment and portable power plants. Its design is such that it requires a minimum of care and maintenance.

While the preferred form of the invention has been illustrated and described, it will be understood that a wide latitude in specific details and materials is possible without departing from the scope of the invention, as defined in the following claims.

I claim:

1. A feeder for fodder comprising a hopper having a discharge opening in the bottom, an imperforate cylindrical open ended drum, supporting means for revolubly holding the drum suspended loosely within and projecting vertically above the hopper, parallel fodder engaging means extending vertically on the inner surface of the drum and means for rotating the drum.

2. A feeder for fodder comprising a hopper having a discharge opening in the bottom, a series of rollers mounted in a horizontal plane around the hopper and above the side wall of the latter, an imperforate cylindrical open ended drum, a horizontal track around the drum adapted to rest on said rollers with the drum suspended loosely within the hopper, parallel fodder engaging means extending vertically on the inner surface of the drum and means for rotating the drum.

3. A feeder for fodder comprising a hopper having a discharge opening in the bottom, a series of rollers mounted in a horizontal plane around the hopper and above the side wall of the latter, an imperforate cylindrical open ended drum, a horizontal track around the drum adapted to rest on said rollers with the drum suspended loosely within the hopper, a horizontal ring gear on the drum, a chain drive engaging the gear and parallel fodder engaging means extending vertically on the inner surface of the drum.

4. A feeder for fodder comprising a hopper having a discharge opening in the bottom, an imperforate cylindrical open ended drum, supporting means for revolubly holding the drum suspended loosely within and projecting above the hopper, a horizontal ring gear on the drum, a chain drive engaging the gear, a rim on the drum extending beyond the gear and parallel fodder engaging means extending vertically on the inner surface of the drum.

5. A feeder for fodder comprising a hopper having a discharge opening in the bottom, an imperforate cylindrical open ended drum, supporting means for holding the drum revolubly within and projecting above the hopper, fodder engaging means extending vertically on the inner surface of the drum, an axial bearing in the bottom of the hopper, a revoluble vertical guide on the bearing, parallel fodder engaging means extending vertically on the surface of the guide, and means for rotating the drum.

6. A feeder for fodder comprising a hopper having a discharge opening in the bottom, an imperforate cylindrical open ended drum, supporting means for holding the drum revolubly within and projecting above the hopper, a flaring rim on the drum, fodder engaging means extending vertically on the inner surface of the drum, an axial bearing in the bottom of the hopper, a revoluble cylindrical guide mounted vertically on the bearing, a conical top to the guide opposite the rim of the drum, parallel fodder engaging means extending vertically on the surface of the guide and means for rotating the drum.

7. A feeder for fodder in freshly harvested form comprising a flat bottom and side walls constituting a cylindrical hopper and having an eccentric discharge opening in the bottom, a series of rollers mounted in a horizontal circle around the hopper and above the side wall thereof, an imperforate cylindrical open bottomed drum, a horizontal bearing flange around the drum adapted to rest on said rollers with the drum suspended loosely within the hopper, parallel fodder engaging means extending vertically on the inner surface of the drum, a revoluble cylindrical guide centrally mounted in the hopper bottom, fodder engaging means on the guide, and means for rotating the drum.

WALTER H. OBERWORTMAN.

References Cited in the file of this patent

UNITED STATES PATENTS

| Number | Name | Date |
|---|---|---|
| 7,336 | Benton | May 7, 1850 |
| 14,134 | Foster | Jan. 22, 1856 |
| 167,235 | Gandolfo | Aug. 31, 1875 |
| 345,940 | Sharpneck | Dec. 28, 1886 |
| 639,406 | Kreiss | Dec. 19, 1899 |
| 842,599 | Williamson | Jan. 29, 1907 |
| 891,765 | Dufour | June 23, 1908 |
| 944,172 | Bond | Dec. 21, 1909 |
| 1,676,241 | Ayars | July 10, 1928 |
| 1,735,226 | Whitney | Nov. 12, 1929 |
| 2,327,923 | Morris | Aug. 24, 1943 |
| 2,492,260 | Bingham | Dec. 27, 1949 |